US012544749B2

(12) United States Patent
Kim et al.

(10) Patent No.: US 12,544,749 B2
(45) Date of Patent: Feb. 10, 2026

(54) METHOD FOR PREPARING SINGLE-ATOM, ATOMIC CLUSTER OR SINGLE-MOLECULAR CATALYST FOR OXIDATIVE COUPLING OF METHANE USING CHEMICAL VAPOR DEPOSITION

(71) Applicant: KOREA INSTITUTE OF ENERGY RESEARCH, Daejeon (KR)

(72) Inventors: Hee-Yeon Kim, Daejeon (KR); Yoonseok Choi, Daejeon (KR); Tae-woo Kim, Daejeon (KR); Ji-haeng Yu, Daejeon (KR); Cha-heon Kim, Seosan-si (KR)

(73) Assignee: Korea Institute of Energy Research, Daejeon (KR)

( * ) Notice: Subject to any disclaimer, the term of this patent is extended or adjusted under 35 U.S.C. 154(b) by 621 days.

(21) Appl. No.: 18/079,568

(22) Filed: Dec. 12, 2022

(65) Prior Publication Data
US 2023/0182126 A1 Jun. 15, 2023

(30) Foreign Application Priority Data
Dec. 13, 2021 (KR) .................. 10-2021-0177986

(51) Int. Cl.
*B01J 37/02* (2006.01)
*B01J 21/08* (2006.01)
(Continued)

(52) U.S. Cl.
CPC ........... *B01J 37/0238* (2013.01); *B01J 21/08* (2013.01); *B01J 23/30* (2013.01); *B01J 23/34* (2013.01); *B01J 37/0244* (2013.01); *B01J 37/08* (2013.01)

(58) Field of Classification Search
CPC ........ B01J 37/0238; B01J 21/08; B01J 23/30; B01J 23/34; B01J 37/0244; B01J 37/08; B01J 23/10; B01J 23/63; B01J 23/83; B01J 23/8892; B01J 23/6562; B01J 37/0207; B01J 37/088; B01J 37/02; B01J 21/06; C07C 2/84; C07C 2521/08; C07C 2523/04; C07C 2523/30; C07C 2523/34;
(Continued)

(56) References Cited

FOREIGN PATENT DOCUMENTS

| JP | 2009160569 A | 7/2009 |
| KR | 1020180127011 A | 11/2018 |
| KR | 102182553 B1 | 11/2020 |

OTHER PUBLICATIONS

Xuxu Ye, Hengwei Wang, Yue Lin, Xinyu Liu, Lina Cao, Jian Gu, and Junling Lu, Insight of the stability and activity of platinum single atoms on ceria, Feb. 18, 2019, Nano Research 12(6): 1401-1409 (Year: 2019).*

(Continued)

*Primary Examiner* — Daniel Berns
*Assistant Examiner* — Joshua Maxwell Speer
(74) *Attorney, Agent, or Firm* — Rabin & Berdo, P.C.

(57) ABSTRACT

According to various aspects and exemplary embodiments of the present disclosure, ultra-small catalyst particles having extremely high reactivity may be synthesized in single-atom or single-molecule state. When the ultra-small-sized single-atom or single-molecule catalyst is used, the use of metal raw materials can be minimized and, at the same time, catalytic activity may be maximized through maximized reactivity of the single-atom or single-molecule catalyst.

9 Claims, 5 Drawing Sheets

(51) Int. Cl.
  *B01J 23/30*   (2006.01)
  *B01J 23/34*   (2006.01)
  *B01J 37/08*   (2006.01)
(58) Field of Classification Search
  CPC . C07C 9/06; C07C 11/04; Y02P 20/52; C23C 16/0209; C23C 16/06
  See application file for complete search history.

(56) References Cited

OTHER PUBLICATIONS

Chiou-Hwang Lee and Yu-Wen Chen, Effect of Support on a Catalytic Converter for Removing CO and HC Emissions from a Two-Stroke Motorcycle, 1997, Ind. Eng. Chem. Res., 36, 5160-5169 (Year: 1997).*

Bisen et al., "Self-Organized Single-Atom Tungsten Supported on the N-Doped Carbon Matrix for Durable Oxygen Reduction." Sep. 1, 2020, ACS Appl. Mater. Interfaces, 12, 43586-43595 (Year: 2020).*

Engineering Master's Thesis, "Properties of Pt—Ru catalyst modified by chemical vapor deposition for direct methanol fuel cell", Seoul National University Graduate School, Department of Applied Chemistry, Aug. 1, 2003.

Yen Thien Chua et al., Applied Catalysis A: General, Oxidative coupling of methane for the production of ethylene over sodium-tungsten-manganese-supported-silica catalyst (Na—W—Mn/SiO2), School of Chemical Engineering, University Science of Malaysia, Engineering Campus, 14300 Nibong Tebal, Penang, Malaysia, Apr. 8, 2008.

* cited by examiner

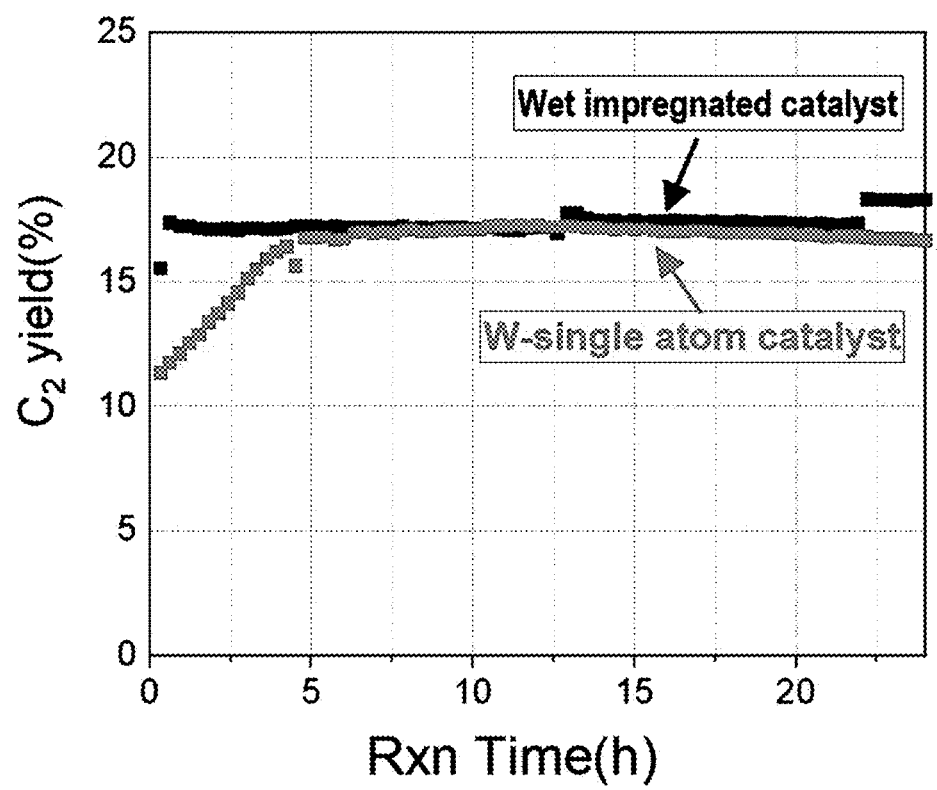

METHOD FOR PREPARING SINGLE-ATOM, ATOMIC CLUSTER OR SINGLE-MOLECULAR CATALYST FOR OXIDATIVE COUPLING OF METHANE USING CHEMICAL VAPOR DEPOSITION

CROSS-REFERENCE TO RELATED APPLICATION

This application claims priority to Korean Patent Application No. 10-2021-0177986 filed on Dec. 13, 2021, and all the benefits accruing therefrom under 35 U.S.C. § 119, the contents of which in its entirety are herein incorporated by reference.

BACKGROUND

1. Field

The present disclosure relates to a method for preparing a single-atom or single-molecule catalyst for oxidative coupling of methane using chemical vapor deposition (CVD).

2. Description of the Related Art

For preparation of a heterogeneous metal catalyst used in a catalytic process, development of a technology that can improve the performance of the catalyst while minimizing the use of the metal is necessary because deposits of metal resources are limited.

The development of heterogeneous catalysts is directed to reducing the size of catalyst particles in order to ensure maximum active area with a minimum amount of material. At the same time, it aims at increasing the stability of the catalyst and maximizing the active area of the catalyst by maximizing the dispersion of the catalyst particles.

For this, various new technologies for preparing catalysts, including impregnation, precipitation, ion exchange, etc. are being developed. However, the development of a technology that can improve the performance of the catalyst while minimizing the use of metals is still necessary.

REFERENCES OF THE RELATED ART

Patent Documents

1. Japanese Patent Publication No. 2009-160569.
2. Korean Patent Registration No. 10-2182553.
3. Korean Patent Publication No. 10-2018-0127011.

SUMMARY

The present disclosure is directed to providing a method for preparing a single-atom or single-molecule catalyst for oxidative coupling of methane using chemical vapor deposition, which allows the synthesis of ultra-small catalyst particles having high reactivity in single-atom or single-molecule state and, through this, can minimize the use of metal raw materials and at the same time maximize catalytic activity through maximized reactivity of the single-atom or single-molecule catalyst.

In an aspect, the present disclosure relates to a method for preparing a M-M' catalyst for oxidative coupling of methane, which includes: (B) a step of depositing a single M metal atom on a M' catalyst deposited on a support by chemical vapor deposition, and (C) a step of preparing a M-M' catalyst by alloying the support with the single M metal atom deposited and the deposited M' catalyst through alloying heat treatment, wherein the M' catalyst is a manganese (Mn) catalyst, a cerium (Ce) catalyst or a mixture thereof, and the M is a metal selected from tungsten (W), platinum (Pt), cobalt (Co), ruthenium (Ru), palladium (Pd), nickel (Ni), titanium (Ti), lithium (Li), molybdenum (Mo), magnesium (Mg), yttrium (Y), ytterbium (Yb), boron (B), barium (Ba) and mixtures thereof.

In another aspect, the present disclosure relates to a method for preparing a M-M' catalyst for oxidative coupling of methane, which includes: (B') a step of depositing a single M metal atom on a support by chemical vapor deposition and then depositing a M' catalyst, and (C') a step of preparing a M-M' catalyst by alloying the support with the single M metal atom deposited and the deposited M' catalyst through alloying heat treatment, wherein the M' catalyst is a manganese (Mn) catalyst, a cerium (Ce) catalyst or a mixture thereof, and the M is a metal selected from tungsten (W), platinum (Pt), cobalt (Co), ruthenium (Ru), palladium (Pd), nickel (Ni), titanium (Ti), lithium (Li), molybdenum (Mo), magnesium (Mg), yttrium (Y), ytterbium (Yb), boron (B), barium (Ba) and mixtures thereof.

In another aspect, the present disclosure relates to a method for preparing a M-M' catalyst for oxidative coupling of methane, which includes: (b) a step of locating the M' catalyst deposited on a support in a reactor, (c) a step of locating a precursor of a M metal in an evaporator, (d) a step of heating the reactor to a reaction temperature, (e) a step of heating the evaporator to an evaporation temperature, (f) a step of supplying a carrier gas to the evaporator and depositing a single M metal atom on the M' catalyst deposited on the support by transporting the carrier gas to the reactor via a gas tube connected to the evaporator, and (g) a step of preparing a M-M' catalyst by alloying the support with the single M metal atom deposited and the deposited M' catalyst through alloying heat treatment, wherein the M' catalyst is a manganese (Mn) catalyst, a cerium (Ce) catalyst or a mixture thereof, and the M is a metal selected from tungsten (W), platinum (Pt), cobalt (Co), ruthenium (Ru), palladium (Pd), nickel (Ni), titanium (Ti), lithium (Li), molybdenum (Mo), magnesium (Mg), yttrium (Y), ytterbium (Yb), boron (B), barium (Ba) and mixtures thereof.

In the step (f), the carrier gas may be an inert gas such as nitrogen, argon, helium, etc. a reactive gas having reactivity such as oxygen, hydrogen, etc., or the inert gas diluted with 5-20 vol % of the reactive gas.

According to various aspects and exemplary embodiments of the present disclosure, ultra-small catalyst particles having extremely high reactivity may be synthesized in single-atom or single-molecule state.

When the ultra-small-sized single-atom or single-molecule catalyst is used, the use of metal raw materials can be minimized and, at the same time, catalytic activity can be maximized through maximized reactivity of the single-atom or single-molecule catalyst.

BRIEF DESCRIPTION OF THE DRAWINGS

FIGS. 5A and 5B show methane conversion rate and $C_2$ yield during oxidative coupling of methane, respectively.

DETAILED DESCRIPTION

Figure 1:
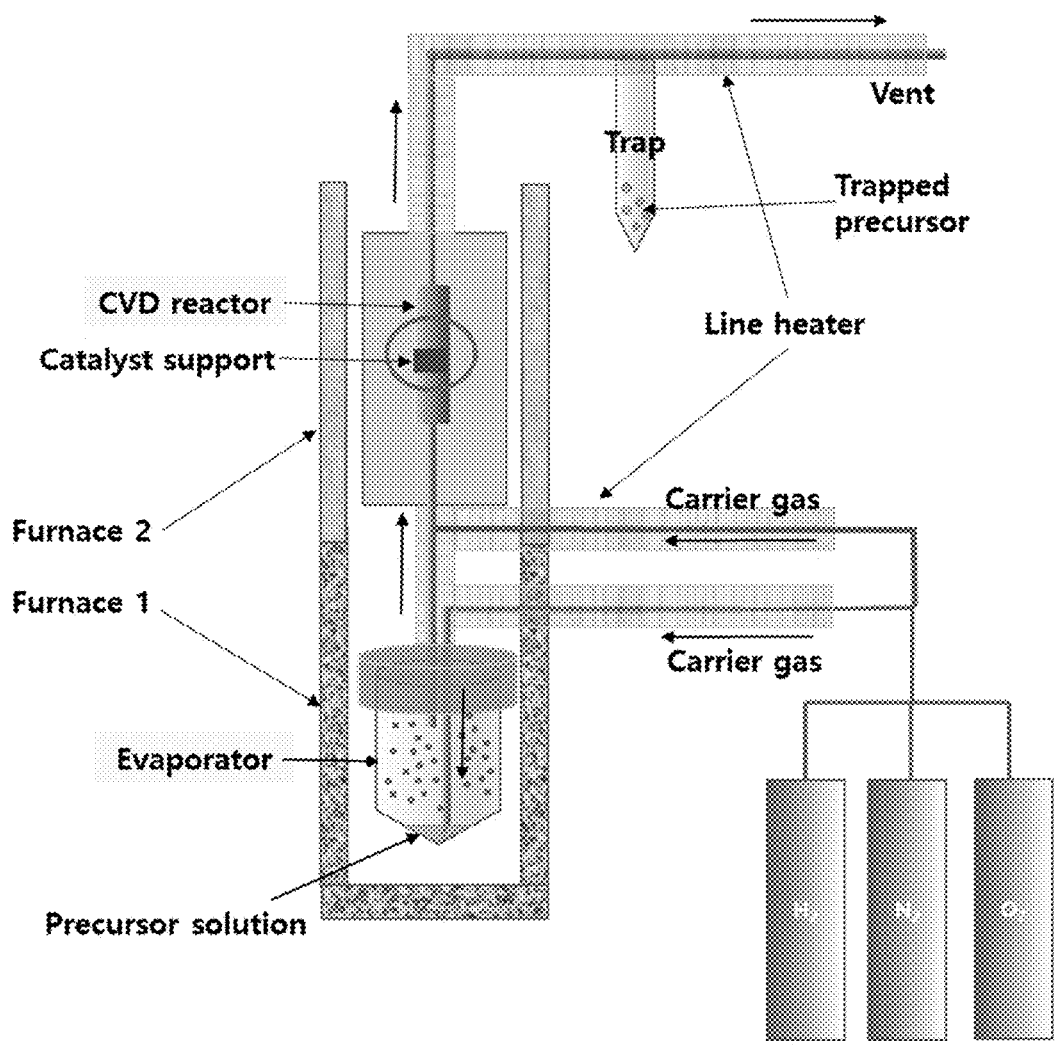
FIG. 1 schematically shows a chemical vapor deposition apparatus for synthesizing a single-atom or single-molecule catalyst according to the present disclosure.

Hereinafter, various aspects and exemplary embodiments of the present disclosure will be described more specifically.

Catalyst particles prepared according to various aspects and exemplary embodiments of the present disclosure have single-atom or single-molecule, i.e., sub-nano sizes, and are in single-atom or single-molecule state, rather than crystalized state. Accordingly, they may exhibit maximized catalytic activity as compared to the conventional crystalized particles.

In general heterogeneous catalysts, dispersion may be represented by the following equation.

Dispersion (%)=100×[number of surface atoms]/ [total number of atoms in the catalyst]

That is to say, the dispersion of catalyst particle represents the ratio of particles exposed on the surface of the catalyst and actually participating in catalytic reaction to the total amount of the metal atoms contained in the catalyst. The dispersion of the catalyst is directly related with the performance of the catalyst. In order to improve the dispersion, it is important to reduce the size of the catalyst particles and, at the same time, to maximize the active area of the catalyst so that the catalyst particles can be dispersed uniformly without aggregating on the surface of a support.

In addition, it is important to strengthen the attractive force between the catalyst particles and the support (metal-support interaction) in order to enhance durability against heat, pressure and electrical stimulations applied during the catalytic reaction.

The present disclosure presents a method of synthesizing single-atom or single-molecule catalyst particles using chemical vapor deposition, which has been used generally for thin film preparation in semiconductor processes. Especially, it presents a preparation method whereby the interaction between a catalyst support and catalyst particles is maximized as a precursor in gas phase is deposited on the surface of the support as single-atom or single-molecule state and, thus, durability can be ensured under high-temperature or high-pressure reaction conditions.

At present, incipient wetness impregnation, precipitation, ion-exchange synthesis, etc. are widely used for preparation of catalysts. Although these methods are advantageous in terms of large-scale preparation of catalysts, there is a limitation in reducing the size of catalyst particles or improving dispersion.

For preparation a catalyst by chemical vapor deposition, a catalyst precursor in gas, liquid or solid phase is vaporized. The precursor in solid or liquid state is vaporized by heating to its boiling point or sublimation point. At this time, the evaporation or sublimation temperature of the precursor can be lowered greatly by reducing the pressure inside a chemical vapor deposition system. After the precursor is evaporated, it is important to optimize temperature and concentration inside the chemical vapor deposition system so that maximum dispersion is maintained on the surface of the porous support, i.e., so that the catalyst particles are deposited selectively at the active sites or defects of the support surface. It is also important to optimize gas flow rate or space velocity so that a gas flow including the evaporated precursor transported to a reactor is contacted with the surface of the porous support in the form of laminar flow and the precursor vapor is adsorbed sufficiently at the active sites or defects of the support surface. For this, it is necessary to precisely control the evaporation condition of the precursor in an evaporator and the condition of the reactor wherein the precursor vapor is deposited on the surface of the porous support, which can be achieved according to various aspects and exemplary embodiments of the present disclosure.

One of the purposes of the present disclosure is to synthesize a heterogeneous catalyst in single-atom or single-molecule state with maximized catalytic performance using a minimum amount of raw materials.

The present disclosure presents a chemical vapor deposition-based synthesis method of a single-atom or single-molecule catalyst, which allows the deposition of a vaporized catalyst precursor on the surface of a catalyst support with high dispersion in atomic or molecular scale.

In an exemplary embodiment, the present disclosure provides a method for preparing a single-atom catalyst, particularly a tungsten (VV) single-atom catalyst, for use as a catalyst for various chemical reactions or electrochemical reactions, an electrode material, a sensor material, etc.

Hereinafter, the various aspects and exemplary embodiments of the present disclosure are described in detail.

In an aspect, the present disclosure relates to a method for preparing a M-M' catalyst for oxidative coupling of methane, which includes:

(B) a step of depositing a single M metal atom on a M' catalyst deposited on a support by chemical vapor deposition, and (C) a step of preparing a M-M' catalyst by alloying the support with the single M metal atom deposited and the deposited M' catalyst through alloying heat treatment.

In an exemplary embodiment, the method further includes steps (A1) and (A2) before the step (B):

(A1) a step of depositing a M' catalyst on the surface of a support using a solution of a precursor of the M' catalyst and then drying the same to obtain a dried M' catalyst deposited on the support, and (A2) a step of obtaining a M' catalyst deposited on the support through heat treatment of the dried M' catalyst so that the functional groups of the M' catalyst precursor are removed and only the catalyst metal component is deposited on the surface of the support.

In the present disclosure, the heat treatment for removing the functional groups of the precursor may be performed by setting temperature, gas atmosphere or time such that $H_2O$ is removed from a precursor such as sodium permanganate monohydrate ($NaMnO_4 \cdot H_2O$) or $(NO_3)_3$ and $H_2O$ are removed from a precursor such as cerium nitrate hexahydrate ($Ce(NO_3)_3 \cdot 6H_2O$). As a non-limiting example, when $NaMnO_4 \cdot H_2O$ is used as a precursor, the heat treatment may be performed under air atmosphere at 450° C. for 4 hours.

The M' catalyst refers to a manganese (Mn) catalyst, a cerium (Ce) catalyst or a mixture thereof, and the dried M' catalyst includes the functional groups of the precursor in addition to the metal component of the M' catalyst.

And, the M is a metal selected from tungsten (W), platinum (Pt), cobalt (Co), ruthenium (Ru), palladium (Pd), nickel (Ni), titanium (Ti), lithium (Li), molybdenum (Mo), magnesium (Mg), yttrium (Y), ytterbium (Yb), boron (B), barium (Ba) and mixtures thereof.

In another aspect, the present disclosure relates to a method for preparing a M-M' catalyst for oxidative coupling of methane, which includes:

(B') a step of depositing a single M metal atom on a support by chemical vapor deposition and then depositing a M' catalyst, and (C') a step of preparing a M-M' catalyst by alloying the support with the single M metal atom deposited and the deposited M' catalyst through alloying heat treatment.

That is to say, after depositing a Mn catalyst, a Ce catalyst or a mixture thereof on a support, a M metal may be deposited by CVD and then an alloy catalyst may be synthesized finally through alloying heat treatment. Alternatively, after depositing a M metal first on a support by CVD, a Mn catalyst, a Ce catalyst or a mixture thereof may be deposited and then an alloy catalyst may be synthesized finally through alloying heat treatment. The compositional distribution of M and M' on the catalyst surface may be different depending on the order of the deposition.

The M' catalyst is a manganese (Mn) catalyst, a cerium (Ce) catalyst or a mixture thereof, and the M is a metal selected from tungsten (W), platinum (Pt), cobalt (Co), ruthenium (Ru), palladium (Pd), nickel (Ni), titanium (Ti), lithium (Li), molybdenum (Mo), magnesium (Mg), yttrium (Y), ytterbium (Yb), boron (B), barium (Ba) and mixtures thereof.

In the present disclosure, various powder or plate supports may be used as the support. The support may be, for example, a silica gel support; a ceramic-based powder support such as silica, alumina, zirconia, titania, zeolite or other porous ceramics; a metal-based support such as a metal plate or a metal foil; a carbon-based support such as carbon black, activated carbon, graphene, carbon nanotube, graphite or other porous carbons; an electrode material such as FTO (fluorine-doped $TiO_2$); and mixtures thereof, although not being limited thereto.

Also, in the present disclosure, the alloying heat treatment may be performed by setting temperature, gas atmosphere or time such that the alloying of the M metal and the M' catalyst can occur. As an example, when tungsten (W) is used, the alloying heat treatment may be performed under air atmosphere at 800° C. for 4 hours.

In another aspect, the present disclosure relates to a method for preparing a M-M' catalyst for oxidative coupling of methane, which includes:

(b) a step of locating a M' catalyst deposited on a support in a reactor, (c) a step of locating a precursor of a M metal in an evaporator, (d) a step of heating the evaporator to an evaporation temperature, (e) a step of heating the reactor to a reaction temperature at which chemical vapor deposition occurs effectively, (f) a step of flowing a carrier gas to the evaporator and depositing a single M metal atom on the M' catalyst deposited on the support by transporting the precursor evaporated in the evaporator to the reactor, and (g) a step of preparing a M-M' catalyst by alloying the support with the single M metal atom deposited and the deposited M' catalyst through alloying heat treatment In the present disclosure, the M' catalyst is a manganese (Mn) catalyst, a cerium (Ce) catalyst or a mixture thereof.

And, the M is a metal selected from tungsten (W), platinum (Pt), cobalt (Co), ruthenium (Ru), palladium (Pd), nickel (Ni), titanium (Ti), lithium (Li), molybdenum (Mo), magnesium (Mg), yttrium (Y), ytterbium (Yb), boron (B), barium (Ba) and mixtures thereof.

The alloying heat treatment is for synthesizing an alloy catalyst suitable for a catalytic reaction and may be performed under hydrogen atmosphere, inert gas atmosphere or air atmosphere where oxygen is present. When it is performed under hydrogen atmosphere, a reduced metal phase may be obtained. And, when it is performed under air or oxygen atmosphere, an alloy catalyst in the form of an oxide may be obtained. When the alloying heat treatment is performed under inert gas atmosphere, an alloy catalyst may be prepared without change in the oxidation/reduction state of the catalyst. If the alloying heat treatment is not performed, different metal phases may be present on the surface of the support, and the performance of the alloy catalyst may not be achieved.

In an exemplary embodiment, the method may further include steps (a1) and (a2) before the step (b):

(a1) a step of depositing a M' catalyst using a solution of a precursor of the M' catalyst and then drying the same to obtain a dried M' catalyst, and (a2) a step of obtaining a M' catalyst deposited on the support through heat treatment of the dried M' catalyst so that the functional groups of the M' catalyst precursor are removed and only the catalyst metal component is deposited on the surface of the support.

In another aspect, the present disclosure relates to a method for preparing a M-M' catalyst for oxidative coupling of methane, which includes:

(b') a step of locating a support in a reactor, (c) a step of locating a precursor of a M metal in an evaporator, (d) a step of heating the reactor to a reaction temperature, (e) a step of heating the evaporator to an evaporation temperature, (f) a step of supplying a carrier gas to the evaporator and depositing a single M metal atom on the support by transporting the carrier gas to the reactor via a gas tube connected to the evaporator, (f-1) a step of depositing a M' catalyst on the support with the single M metal atom deposited, and (g) a step of preparing a M-M' catalyst by alloying the support with the single M metal atom deposited and the deposited M' catalyst through alloying heat treatment.

The M' catalyst refers to a manganese (Mn) catalyst, a cerium (Ce) catalyst or a mixture thereof, and the dried M' catalyst includes the functional groups of the precursor in addition to the metal component of the M' catalyst.

And, the M is a metal selected from tungsten (W), platinum (Pt), cobalt (Co), ruthenium (Ru), palladium (Pd), nickel (Ni), titanium (Ti), lithium (Li), molybdenum (Mo), magnesium (Mg), yttrium (Y), ytterbium (Yb), boron (B), barium (Ba) and mixtures thereof.

In another exemplary embodiment, the method further includes, before the step (d), (c1') a step of supplying a gas for creating a gas atmosphere in the reactor into the reactor or further includes, simultaneously with the step (f), (c2') a step of supplying a gas for creating a gas atmosphere in the reactor into the reactor.

The gas flown into the reactor, the gas flown into the evaporator or the carrier gas may be an inert carrier gas selected from nitrogen, argon, helium and mixtures thereof, or the inert carrier gas with oxygen or hydrogen included therein.

When an inert gas including hydrogen flows in the reactor (e.g., when 5 sccm of hydrogen is included in 30 sccm of a gas (nitrogen, argon or helium) flowing in the reactor), both the metal and the support can be reduced easily due to the presence of hydrogen. As a result, they may be reduced before the precursor reaches the support surface and, in some cases, the interaction between the metal and the support may be increased further.

However, the presence of the reactive gas that renders the precursor easily reducible it is not necessarily favorable for the synthesis of the single-atom catalyst by chemical vapor deposition. The degradation pattern of the precursor will vary depending on the concentration of the supplied reactive gas, chemical vapor deposition temperature, etc.

When hydrogen is included in the gas flowing into the reactor through the evaporator (e.g., when 5 sccm of hydrogen is included in 30 sccm of a gas in the evaporator and the gas flows to the reactor after passing the evaporator), the degradation of the precursor can be facilitated by increasing the temperature of the evaporator when the catalyst precursor is present to the evaporation temperature of the precursor and flowing a mixture gas of an inert gas and hydrogen. In this case, the hydrogen atmosphere may be advantageous in that the precursor can be degraded in advance in the evaporator by hydrogen and then transported to the reactor in the form of small molecules. The particles that have been degraded in advance in the evaporator and transported to the reactor in the form of small molecules can be deposited on the surface of the catalyst support inside the reactor while retaining superior dispersion.

However, the presence of hydrogen may also be disadvantageous on the contrary. For example, the precursor that has been degraded in advance in the evaporator may be coated on the inner wall of the evaporator, or the deposition of the single-atom catalyst may not occur as it is converted to another compound via reaction with the hydrogen.

Alternatively, when an inert gas including oxygen flows in the reactor (e.g., when 5 sccm of oxygen is included in 30 sccm of the gas flowing in the reactor, and 5 sccm of oxygen is included in 30 sccm of the carrier gas), the precursor may be oxidized or degraded as the catalyst precursor is heated to the evaporation temperature due to the presence of oxygen. This oxygen atmosphere may be favorable in that the precursor can reach the reactor in the form of small particles including the metal component with functional groups unnecessary for deposition removed in advance.

However, the presence of oxygen in the carrier gas is not necessarily favorable for the degradation of the precursor and the synthesis of the single-atom catalyst. For example, the presence of oxygen may be unfavorable for the preparation and performance of a catalyst if the precursor that has been rapidly degraded in the evaporator is coated on the inner wall of the evaporator or the synthesis of inactive oxides is facilitated by oxidation of the precursor.

In another exemplary embodiment, the method further includes, before the step (e), (c") a step of supplying a reactive gas including oxygen or hydrogen into the evaporator.

In another exemplary embodiment, the method further includes, before the step (g), (f') a step of interrupting the flow of the carrier gas transported to the reactor and supplying an inert carrier gas selected from nitrogen, argon, helium and mixtures thereof into the reactor.

In another aspect, the present disclosure relates to a method for preparing a M-M' catalyst for oxidative coupling of methane, which includes:
 (a1) a step of depositing a solution of a precursor of a M' catalyst on a support and then drying the same to obtain a dried catalyst,
 (a2) a step of obtaining a M' catalyst deposited on the support by removing the functional groups of the precursor of a M' catalyst through heat treatment of the dried catalyst,
 (b) a step of locating the M' catalyst deposited on the support in a reactor,
 (c) a step of locating the precursor of a M metal in an evaporator,
 (c') a step of supplying a gas for creating a gas atmosphere in the reactor into the reactor,
 (c") a step of supplying a gas for creating a gas atmosphere in the evaporator into the evaporator,
 (d) a step of heating the reactor to a reaction temperature,
 (e) a step of heating the evaporator to an evaporation temperature,
 (f) a step of supplying a carrier gas to the evaporator and depositing a single M metal atom on the M' catalyst deposited on the support by transporting the carrier gas to the reactor via a gas tube connected to the evaporator,
 (f') a step of interrupting the flow of the carrier gas transported to the reactor and supplying an inert carrier gas selected from nitrogen, argon, helium and mixtures thereof into the reactor, and
 (g) a step of preparing a M-M' catalyst by alloying the support with the single M metal atom deposited and the deposited M' catalyst through alloying heat treatment.

The M' catalyst is a manganese (Mn) catalyst, a cerium (Ce) catalyst or a mixture thereof.

And, the M is a metal selected from tungsten (W), platinum (Pt), cobalt (Co), ruthenium (Ru), palladium (Pd), nickel (Ni), titanium (Ti), lithium (Li), molybdenum (Mo), magnesium (Mg), yttrium (Y), ytterbium (Yb), boron (B), barium (Ba) and mixtures thereof.

In an exemplary embodiment, in the step (d), the reactor is heated to a reaction temperature selected within a range of 80-800° C. at a rate of 1-9° C./min, and, in the step (e), the evaporator is heated to an evaporation temperature selected within a range of 40-400° C. at a rate of 1-9° C./min.

If the reactor heating rate is below the lower limit or exceeds the upper limit, e.g., 10° C./min, the concentration of the precursor in the reactor may not be maintained constant due to rapid evaporation of the precursor but may be increased or decreased rapidly. As a result, it may be unfavorable for deposition of the single-atom catalyst on the catalyst support surface inside the reactor and catalytic activity may be decreased rapidly as the dispersion of the catalyst deposited on the support is decreased greatly.

In particular, when the M is tungsten (W), it is preferred that the evaporation temperature is selected within a range of 90-100° C. and the reaction temperature is selected within a range of 180-200° C.

If the evaporation temperature is higher than the upper limit, the precursor may be degraded before it reaches the support surface or another material may be synthesized due to the degradation and polymerization of the precursor. If the evaporation temperature is lower than the lower limit, the catalyst may not be prepared as the precursor is discharged without being deposited on the support surface.

In another exemplary embodiment, the gas for creating a gas atmosphere in the evaporator is an inert carrier gas selected from nitrogen, argon, helium and mixtures thereof, or a reactive carrier gas wherein oxygen or hydrogen is included in the inert carrier gas.

In another exemplary embodiment, the gas for creating a gas atmosphere in the reactor is an inert carrier gas selected from nitrogen, argon, helium and mixtures thereof, or the inert carrier gas including oxygen or hydrogen.

In another exemplary embodiment, in the step (g), the alloying heat treatment is performed under a gas atmosphere selected from air, oxygen, hydrogen and mixtures thereof at 400-1,200° C. for 1-6 hours.

If the alloying heat treatment is under a different gas atmosphere, the individual metal phases may exist as separate phases without being alloyed and, as a result, the catalytic performance for oxidative coupling of methane may not be achieved.

And, if the temperature of the alloying heat treatment is below the lower limit, the alloying may not occur. If the temperature exceeds the upper limit, it may be difficult to synthesize an alloy because the metal is melted or vaporized.

And, if the time of the alloying heat treatment is shorter than the lower limit, alloying may not occur enough. If the time is longer than the upper limit, nano-sized or larger particles may grow, rather than single-atom particles, due to additional sintering of the catalyst after the alloying.

In another exemplary embodiment, the M is tungsten (W) or cobalt (Co).

In another exemplary embodiment, the support is a powder or plate support.

In another exemplary embodiment, the support is selected from a ceramic-based support such as silica gel, silica powder, alumina, zirconia, titania, zeolite or mixtures thereof; a metal-based support such as a metal plate or a metal foil; a carbon-based support such as carbon black, activated carbon, graphene, carbon nanotube, graphite or other porous carbons; a transparent electrode; and mixtures thereof.

In another exemplary embodiment, in the step (b), the M' catalyst deposited on the support is located on an amorphous material or a porous filter provided at the center of the reactor.

In another exemplary embodiment, in the step (f), the carrier gas is supplied at a rate of 10-90 sccm for 1-240 minutes.

If the supply rate of the carrier gas is below the lower limit, catalytic performance may be decreased due to a very low deposition amount of the single-atom catalyst. And, if the supply rate exceeds the upper limit, the deposition amount of the single-atom catalyst may be excessively higher than the required amount or operation cost may be increased excessively as longer operation is necessary.

In another exemplary embodiment, the precursor is $W(CO)_6$ and the evaporation temperature is 80-100° C.

Particularly, when $W(CO)_6$ is used as the precursor, it is important to maintain the evaporation temperature within a range of 80-100° C., which is lower than the generally known evaporation temperature (175° C.) of $W(CO)_6$ at normal pressure. When precursor $W(CO)_6$ is used as the precursor, if the evaporation temperature is below 80° C. or exceeds 100° C., the precursor may not be evaporated, the precursor may be degraded before it reaches the support, or another material may be synthesized from the degraded precursor. As a result, the deposition of the single-atom or single-molecule tungsten catalyst may be decreased greatly.

In the present disclosure, the support includes a sodium (Na) component. Specifically, it includes 0.1-20 wt % of a sodium (Na) component based on the total weight of the support and the sodium component. The sodium component affects the crystallization of the support. If it is not included, crystallization occurs at high temperatures above, for example, 1,200° C. However, if it is included, crystallization can occur at relatively low temperatures of, e.g., about 800° C.

Although it was not presented as separate examples and comparative example, it was confirmed that the catalytic activity of the M-M' catalyst for oxidative coupling of methane prepared according to the present disclosure is maximized when all the following conditions were satisfied due to selective deposition only at the active sites or defects of the support. When any of the following conditions was not satisfied, the catalytic activity was not maximized due to nonspecific deposition of the support surface at regions other than the active sites or defects.

(i) the M is tungsten (W), (ii) the precursor is $W(CO)_6$, (iii) in the step (d), the reactor is heated at a rate of 1-9° C./min, (iv) the reaction temperature is selected within a range of 150-250° C., (v) in the step (e), the evaporator is heated at a rate of 1-9° C./min, (vi) the evaporation temperature is selected within a range of 80-150° C., (vii) in the step (f), the carrier gas is supplied at a rate of 20-100 sccm for 20-240 minutes, and (viii) the alloying heat treatment is performed under air atmosphere at 700-900° C. for 3-5 hours.

The precursor of a M metal may be a tungsten-based precursor, a platinum-based precursor, a cobalt-based precursor, a ruthenium-based precursor, a palladium-based precursor, a nickel-based precursor and mixtures thereof, although not being limited thereto.

Hereinafter, the precursors that can be used in the present disclosure will be described more specifically.

Examples of the tungsten-based precursor include bis (tert-butylimino)bis(tert-butylamino)tungsten, bis(tert-butylimino)bis(dimethylamino)tungsten(VI), bis(tert-butylimino)bis(dimethylamino)tungsten(VI), bis (cyclopentadienyl)tungsten(IV) dihydride, bis (isopropylcyclopentadienyl)tungsten(IV) dihydride, tetracarbonyl(1,5-cyclooctadiene)tungsten(0), tungsten hexacarbonyl, tungsten hexakis(phenoxide), tungsten(VI) fluoride, $WO(OCH_2CF_3)_4$, $WO[OC(CH_3)_2CF_3]4$, bis(fluoroalkoxide) dioxo tungsten, tungsten hexachloride and mixtures thereof, although not being limited thereto.

Examples of the platinum-based precursor include cis-dichlorodicarbonylplatinum(II), (trimethyl) ethylcyclopentadienylplatinum(IV), dimethyl(1,5-cyclooctadiene)platinum(II), platinum(II) acetylacetonate, platinum(II) hexafluoroacetylacetonate, (trimethyl) cyclopentadienylplatinum(IV), (trimethyl) methylcyclopentadienylplatinum(IV), (trimethyl) pentamethylcyclopentadienylplatinum(IV), tris(dibenzylideneacetone)platinum(0), (bis-dimethylglyoximato) (bis-dimethylgallium) (methylcyclopentadienyl) platinum, dimethylplatinum (1,5-cyclooctadiene), bis(cyclopentyl)platinum and mixtures thereof, although not being limited thereto.

Examples of the cobalt-based precursor include bis(N-t-butyl-N'-ethylpropanimidamidato)cobalt(II), bis(N,N'-di-i-propylacetamidinato)cobalt(II), bis(1,4-di-t-butyl-1,3-diazabutadienyl)cobalt(II), bis(1,4-di-t-butyl-1,3-diazabutadienyl)cobalt(II) ($Co(DAD)_2$), bis (cyclopentadienyl)cobalt(II), cobalt(III) acetylacetonate, cobalt carbonyl, cobalt tricarbonyl nitrosyl, cyclopentadienylcobalt dicarbonyl, (3,3-dimethyl-1-butyne)dicobalt hexacarbonyl, tris(2,2,6,6-tetramethyl-3,5-heptanedionato)cobalt(III), bis(b-diketonato)Co(II), tris (dimethylheptanedionato)cobalt(III), tris(3,5-heptanedionato) cobalt(III), bis(tris(2,6-dimethyl-3,5-heptanedione)Co, (1-phenyl-1,3-butanedione)Co, tris(1,3-diphenyl-1,3-propanedione)Co, bis(thenoyltrifluoroacetone)(N,N,N,N-tetramethylethylendiamine)Co, cobalt tetracarbonyl hydride, $Co(PF_3)_4H$, bis(4-(methoxyethylamino)pent-3-en-2-onato) cobalt(II) and mixtures thereof, although not being limited thereto.

Examples of the ruthenium-based precursor include bis (1,1,1-trifluoro-2,4-pentanedionato)(1,5-cyclooctadiene)ruthenium(II), bis(N, N-di-t-butylacetamidinato)ruthenium(II) dicarbonyl, allylruthenium(II) tricarbonyl bromide, bis(cyclopentadienyl)ruthenium, bis(ethylcyclopentadienyl)ruthenium(II), bis(2-methylallyl)(1,5-cyclooctadiene)ruthenium (II), bis(pentamethylcyclopentadienyl)ruthenium, bis(2,2,6,6-tetramethyl-3,5-heptanedionato)(1,5-cyclooctadiene) ruthenium(II), dicarbonylcyclopentadienylruthenium dimer, ruthenium(III) acetylacetonate, ruthenium carbonyl, bis(2,4-dimethylpentadienyl)ruthenium, (ethylbenzene) (1,3-cyclohexadiene) Ru(0), (η6-benzene)(η4-1,3-cyclohexadiene) ruthenium, methylcyclopentadienylpyrrolyl ruthenium, Ruthenium tetroxide, ToRuS(solution of RuO4 in an inert organic solvent), tricarbonyl-1, 3-cyclohexadienyl ruthenium, tris(1,1,1-trifluoropentane-2,4-dionato)ruthenium (III), tris(2,2,6,6-tetramethyl-3,5-heptanedionato)ruthenium (III), tris(dipivaloylmethanato) ruthenium, tris(octadionato) ruthenium. 2,4-dimethylpentadienylethylcyclopentadienyl ruthenium, isopropyl-methylbenzene-cyclohexadiene Ru(0), dicarbocyl tris(2,4-pentanedionato), bis(1,1,1,5,5,5-hexafluoro2,4-pentanedione) ruthenium(II) dicarbonyl, bis (2,2,6,6-tetramethylheptane-3,5-dione) ruthenium(II) dicarbonyl, cyclopentadienylisopropylcyclopentadienyl ruthenium(II), T-Rudic, triruthenium dodecacarbonyl, bis(pentamethylcyclopentadienyl) ruthenium and mixtures thereof, although not being limited thereto.

Examples of the palladium-based precursor include 1-methylallyl(hexafluoroacetylacetonato)-palladium(II), palladium tetramethylheptanedionate, palladium(II) hexafluoroacetylacetonate, bis(2,2,6,6-tetramethyl-3,5-heptanedionato)palladium(II), allyl(cyclopentadienyl)palladium(II), palladium acetylacetonate, palladium 2-methoxy-2,6,6-trimethylheptane-3,5-dionate, bis(2,4-pentanedionate) palladium, bis(1,1,1,6,6,6-hexafluoro-2,4-pentanedionate) palladium, Pd(η3-2-methylallyl)(2,4-pentanedionate), bis (acetato)palladium, (η3-allyl)(η5-cyclopentadienyl) palladium and mixtures thereof, although not being limited thereto.

Examples of the nickel-based precursor include Ni(II) chloride, nickel(II) acetylacetonate, bis(methylcyclopentadienyl)nickel, nickel carbonyl, nickel bis(dimethylglyoximate), nickel tetramethylheptanedionate, N,N'-ethylenebis (2,4-pentanedion-iminoato)nickel(II), nickel bis(2-aminopent-2-en-Onato), nickelocene, bis(1,4-di-isopropyl-1,3-diazabutadienyl)nickel, bis-(ethylcyclopentadienyl)nickel, cyclopentadienylallylnickel, (tetramethylethylenediamine) nickel bis(acetylacetonate), allyl-alkylpyrrolyliminonickel (II), bis(N,N'-di-tert-butylacetamidinato)nickel(II), (η3-cyclohexenyl)(η5-cyclopentadienyl)nickel(II), nickel tetracarbonyl, bis(1,4-di-t-butyl-1,3-diazabutadienyl)nickel(II), bis (1,2-diphenylethanedionedioximato)nickel(II), nickel 1-diethylamino-2-methyl-2-propanolate, bis(3,4-hexanedionedioximato) nickel(II), nickel(II) 1-dimethylamino-2-methyl-2-butoxide, (dimethylamino-2-propoxide) nickel, bis(1,4-diisopropyl-1,4-diazabutadiene) nickel, bis(4,5-octanedionedioximato)nickel(II), bis(4-N-ethylamino-3-penten-2-N-ethyliminato)nickel(II), bis(ethanedialdioximato) nickel(II), nickel 1,1,1,5,5,5-hexafluoroacetylacetonate, bis(2-imino-pen-en-4-trifluoroacetylacetonato)nickel, bis(2,3-pentanedionedioximato) nickel(II), bis(1,2-cyclohexanedionedioximato)nickel(II), nickel bis(N,N'-ditertialbutylacetamidinate), bis(1,4-di-tert-butyl-diaza-1,3-butadiene)nickel, nickel bis(N, N'-di-tert-butylacetamidinate), nickel(II) bis(2,2,6,6-tetramethyl-3,5-heptanedionate), (2-thenoyltrifluoroacetone) (tetramethylethylenediamine)nickel, (N, N, N', N',-tetramethyl-1,3-propanediamine)nickel(II) chloride, bis (pentamethylcyclopentadienyl)nickel(II), bis(i-propylcyclopentadienyl)nickel and mixtures thereof, although not being limited thereto.

Hereinafter, the method for preparing a M-M' catalyst for oxidative coupling of methane by depositing a single-atom or single-molecule M metal through chemical vapor deposition according to the present disclosure will be described more specifically.

However, it is obvious that the scope of the present disclosure relating to a method for preparing a M-M' catalyst for oxidative coupling of methane is not limited by the following description.

A single-atom or single-molecule catalyst according to the present disclosure may be synthesized using a chemical vapor deposition apparatus schematically illustrated in FIG. 1.

Silica gel may be used as a catalyst support. In order to remove water existing inside and outside the silica support, the silica gel support is dried in the air at 110° C. for 12 hours and then it is located in a reactor (CVD reactor).

Various powder or plate supports may be used in addition to the silica gel. Examples of the support include various ceramic-based powder supports such as silica, alumina, zirconia, titania, zeolite or other porous ceramics, metal-based supports such as metal plate or foil, carbon-based supports such as carbon black, activated carbon, graphene, carbon nanotube, graphite or other porous carbons, or a transparent electrode such as FTO (fluorine-doped $TiO_2$), although not being limited thereto.

Figure 2:
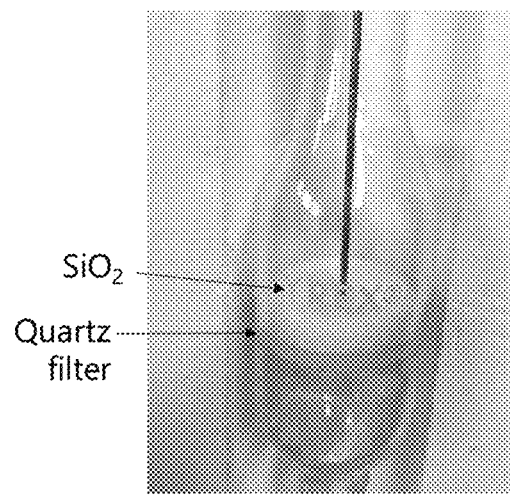
FIG. 2 shows $SiO_2$ powder loaded on a fixed quartz filter.
Figure 3:
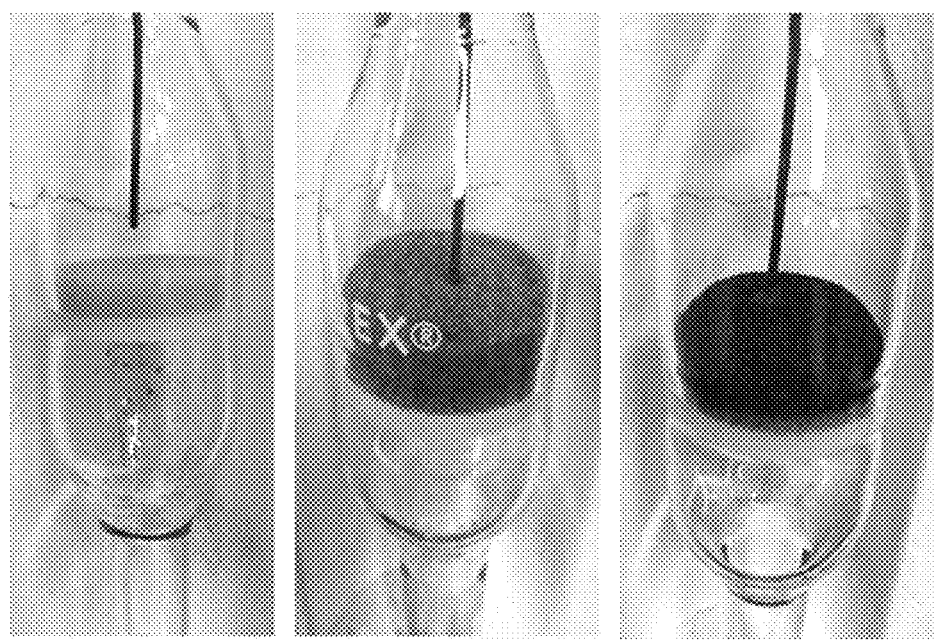
FIG. 3 shows reactors in which different amounts of tungsten-deposited catalysts are located at the center by chemical vapor deposition.
Figure 4A:
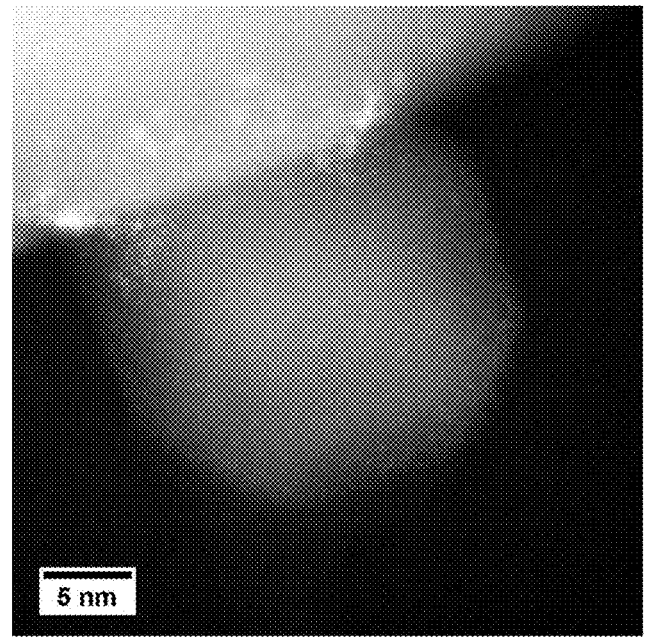
FIGS. 4A and 4B show a result of depositing a W single-atom catalyst on the surface of a $NaMn/SiO_2$ catalyst, treating the same under air atmosphere at 800° C. for 4 hours and then analyzing the same by scanning transmission electron microscopy (STEM).
Figure 4B:
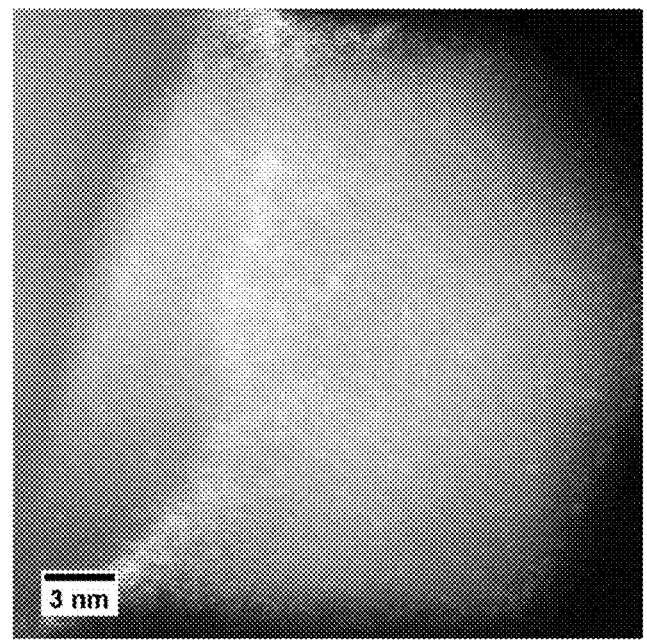

The reactor may be a tube reactor made of pyrex or quartz. In order to stably fix the powder or plate support described above inside the reactor, an amorphous material such as glass wool or Cerak wool may be fixed at the center of the reactor or, as shown in FIG. 2, a porous filter made of quartz or pyrex may be attached at the center of the reactor and the support may be located thereon.

Then, a precursor for synthesizing single-atom or single-molecule particles is supplied into an evaporator.

By flowing a carrier gas (Ar, $N_2$, He or a mixture gas thereof) into the evaporator wherein the precursor is located for 30 minutes or longer using a separate gas inlet, impurities are removed and the inside of the evaporator is maintained as an inert atmosphere.

Likewise, by flowing a carrier gas (Ar, $N_2$, He or a mixture gas thereof) into the reactor wherein the support is located for 30 minutes or longer using a separate gas inlet, impurities are removed and the inside of the support is maintained as an inert atmosphere.

A gas line connected to the evaporator wherein the precursor is located is heated by a preheater, a line heater, etc. so that the temperature of the introduced gas is the same as the temperature of the evaporator, thereby minimizing temperature gradient inside the evaporator. In addition, a line connecting the evaporator with the reactor is also heated using a line heater, a heating furnace, etc. to the same temperature as the reactor so as to prevent re-condensation of the evaporated precursor.

Alternatively, the evaporator wherein the precursor is located and the gas line may be located in an oven to maintain them at the same temperature.

After maintaining the atmosphere inside the evaporator and the reactor as an inert gas atmosphere, the evaporator is heated to the evaporation or sublimation temperature of the precursor in order to evaporate the precursor.

For instance, when a single-atom tungsten catalyst is synthesized using tungsten hexacarbonyl ($W(CO)_6$), in the sate where the evaporator wherein the precursor is located is heated to 90° C. and the reactor where the $SiO_2$ support is located is heated to 180° C., a carrier gas (Ar, $N_2$, He or a mixture gas thereof) is flown through the evaporator.

After the evaporator and the reactor reach target temperatures (evaporator: 90° C., reactor: 180° C.), 30 sccm of the carrier gas is supplied to the evaporator, so that catalyst synthesis is initiated by chemical vapor deposition as the carrier gas flows into the reactor through the evaporator.

Chemical vapor deposition is conducted for a predetermined time from the time when the carrier gas begins to flow into the evaporator, so that catalyst particles are deposited on the surface of the porous support.

The time during which the carrier gas is flown can be controlled for control of deposition amount.

In addition, the size of metal particles deposited on the surface of the porous support may be controlled by raising or lowering the temperature of the reactor.

In addition, instead of using an inert gas such as Ar, $N_2$, He or a mixture gas thereof as the carrier gas, a reactive gas such as oxygen or hydrogen or a reactive gas mixed with an inert gas may be used to control the dispersion, particle size, etc. of the catalyst.

If the pressure of the evaporator and the chemical vapor deposition reactor is lowered below atmospheric pressure, the precursor may be evaporated below the boiling point (evaporation point) of the precursor. That is to say, the evaporation of the precursor may be promoted by lowering pressure.

Hereinafter, the present disclosure is described in more detail through examples. However, the scope and contents of the present disclosure are not limited by the examples.

In addition, it is obvious that the present disclosure can be easily carried out by to those having ordinary knowledge based on the description of the present disclosure including the examples and that changes and modifications thereof are included in the scope of the appended claims.

In the followings, only the representative experimental results of examples and comparative examples are described.

EXAMPLES

Comparative Example: Preparation of NaW/Mn/SiO$_2$ Impregnation Catalyst

Precursors were prepared such that the weight ratio of $Mn_2O_3$ was 2 wt % based on the total weight of the catalyst (i.e., $Mn_2O_3:Na_2WO_4:SiO_2$=2:5:93).

An aqueous Mn solution was prepared by dissolving $Mn(NO_3)_2 \cdot 4H_2O$ (manganese(II) nitrate hydrate, Sigma-Aldrich) in distilled water. After uniformly depositing the aqueous solution in $SiO_2$ (Davisil grade 636, pore volume 0.4 cm$^3$/g, Sigma-Aldrich), the Mn-deposited catalyst was dried in an oven at 105° C. for 12 hours or longer.

An aqueous NaW solution was prepared by dissolving $Na_2WO_4 \cdot 2H_2O$ (sodium tungstate dehydrate, Sigma-Aldrich) in distilled water. After additionally depositing the aqueous solution in the Mn-deposited Mn/SiO$_2$, the catalyst was dried in an oven at 105° C. for 12 hours or longer.

The dried catalyst was prepared into an alloy by heat-treating in an electric furnace at 800° C. under air atmosphere for 4 hours.

Example 1

Deposition Followed by Vapor Deposition (1) Preparation of NaMn/SiO$_2$ Catalyst An aqueous NaMn solution was prepared by dissolving NaMnO$_4 \cdot$H$_2$O (Sigma-Aldrich, sodium permanganate monohydrate 97%) in distilled water (NaMnO$_4$:SiO$_2$=3.59:96). The maximum amount of W deposition by CVD was assumed to be 1 wt %, and the content of $Mn_2O_3$ was adjusted to that of Mn.

The aqueous solution was deposited in SiO$_2$ (Davisil grade 636 pore volume 0.4 cm$^3$/g, Sigma-Aldrich) powder. The NaMn-deposited catalyst powder was dried in an oven at 105° C. for 12 hours or longer.

After removing H$_2$O from the precursor by heat-treating the dried catalyst in an electric furnace at 450° C. under air atmosphere for 4 hours, a NaMnO$_4$/SiO$_2$ catalyst in oxide form was prepared for CVD.

(2) Preparation of W—NaMn/SiO$_2$ Catalyst

The prepared NaMnO$_4$/SiO$_2$ catalyst was quantified and located at the center of a reactor. Then, a quantified W(CO)$_6$ (tungsten hexacarbonyl, Sigma-Aldrich) precursor was located in an evaporator.

Impurities in the evaporator and the reactor were removed by flowing 30 sccm of nitrogen for 30 minutes or longer.

After setting the reactor temperature to 180° C. (heating time=1 hour) and the evaporator temperature to 90° C. (heating time=1 hour), the evaporator and the reactor were heated so that they could reach the set temperatures at the same time.

While the evaporator and the reactor were maintained at the set temperatures, chemical vapor deposition was performed by flowing 30 sccm of nitrogen into the evaporator for 30 minutes or longer.

Then, after closing all the valves of the evaporator wherein the precursor was located, the heating was stopped and the reactor was cooled to room temperature while flowing 30 sccm of nitrogen in the state where the flow of the precursor in the evaporator was interrupted. The obtained W—NaMn/SiO$_2$ catalyst was alloyed by heat-treating (annealing) at 800° C. for 4 hours under air atmosphere.

Example 2

Vapor Deposition Followed by Deposition (1) Preparation of W/SiO$_2$ Catalyst

SiO$_2$ (Davisil grade 636 pore volume 0.4 cm$^3$/g, Sigma-Aldrich) powder was located at the center of a reactor. Then, a quantified W(CO)$_6$ (tungsten hexacarbonyl, Sigma-Aldrich) precursor was located in an evaporator.

Impurities in the evaporator and the reactor were removed by flowing 30 sccm of nitrogen for 30 minutes or longer.

After setting the reactor temperature to 180° C. (heating time=1 hour) and the evaporator temperature to 90° C. (heating time=1 hour), the evaporator and the reactor were heated so that they could reach the set temperatures at the same time.

While the evaporator and the reactor were maintained at the set temperatures, chemical vapor deposition was performed by flowing 30 sccm of nitrogen into the evaporator for 30 minutes or longer.

Then, after closing all the valves of the evaporator wherein the precursor was located, the heating was stopped and the reactor was cooled to room temperature while flowing 30 sccm of nitrogen in the state where the flow of the precursor in the evaporator was interrupted.

(2) Preparation of NaMn-W/SiO$_2$ Catalyst

An aqueous NaMn solution was prepared by dissolving NaMnO$_4$. H$_2$O (sodium permanganate monohydrate 97%, Sigma-Aldrich) in distilled water (NaMnO$_4$:SiO$_2$=3.59:96).

The maximum amount of W deposition by CVD was assumed to be 1 wt %, and the content of $Mn_2O_3$ was adjusted to that of Mn.

The aqueous solution was deposited in W-deposited $SiO_2$ (Davisil grade 636 pore volume 0.4 cm³/g, Sigma-Aldrich) powder. The W- and NaMn-deposited catalyst powder was dried in an oven at 105° C. for 12 hours or longer.

$H_2O$ was removed from the precursor and a W—NaMn/$SiO_2$ catalyst was prepared by heat-treating the dried catalyst in an electric furnace at 450° C. under air atmosphere for 4 hours.

The obtained W—NaMn/$SiO_2$ catalyst was alloyed by heat-treating (annealing) at 800° C. for 4 hours under air atmosphere.

Test Example

Evaluation of Performance of Oxidative Coupling of Methane of W—NaMn/$SiO_2$ Catalyst Oxidative coupling of methane was performed for 24 hours at 800° C. with the volume ratio of methane and oxygen as 2:1. The result is shown in FIGS. 5A and 5B.

Figure 5A:
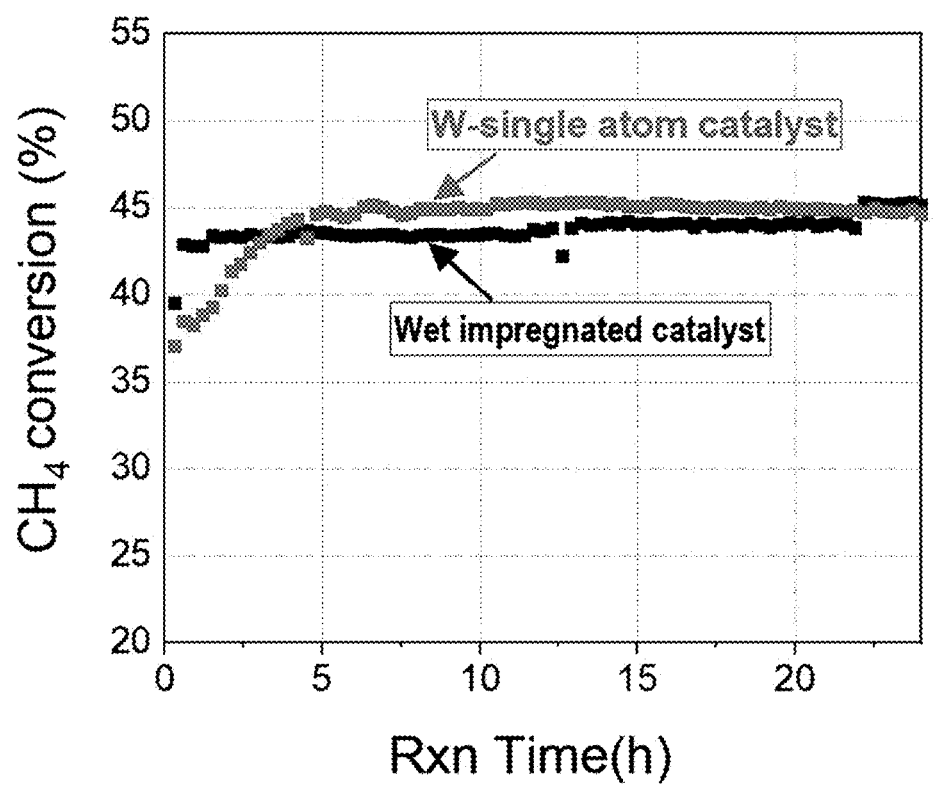

In FIGS. 5A and 5B, the "W single-atom catalyst" is a catalyst prepared in the example by the chemical vapor deposition method described above wherein 0.03 wt % of W is deposited. And, the "wet-impregnated catalyst" is a catalyst prepared in the comparative example according to the conventional incipient wetness impregnation method wherein 3.3 wt % of W is deposited.

As shown in FIG. 5A, the W single-atom catalyst synthesized by the chemical vapor deposition method showed methane conversion rate comparable to that of the conventional impregnated catalyst for oxidative coupling of methane even though the catalyst deposition amount was less than 1/100.

Also, as shown in FIG. 5B, the two catalysts showed similar yield of $C_2$ ($C_2H_4$, $C_2H_6$, etc.) for oxidative coupling of methane despite the large difference in the catalyst deposition amounts.

What is claimed is:

1. A method for preparing a M-M' catalyst for oxidative coupling of methane, comprising: (a1) a step of depositing a solution of a precursor of a M' catalyst on a support and then drying the same to obtain a dried catalyst, (a2) a step of obtaining a M' catalyst deposited on the support by removing the functional groups of the precursor of a M' catalyst through heat treatment of the dried catalyst, (b) a step of locating the M' catalyst deposited on the support in a reactor, (c) a step of locating the precursor of a M metal in an evaporator, (c') a step of supplying a gas for creating a gas atmosphere in the reactor into the reactor, (c") a step of supplying a gas for creating a gas atmosphere in the evaporator into the evaporator, (d) a step of heating the reactor to a reaction temperature, (e) a step of heating the evaporator to an evaporation temperature, (f) a step of supplying a carrier gas to the evaporator and depositing a single M metal atom on the M' catalyst deposited on the support by transporting the carrier gas to the reactor via a gas tube connected to the evaporator, (f') a step of interrupting the flow of the carrier gas transported to the reactor and supplying an inert carrier gas selected from nitrogen, argon, helium and mixtures thereof into the reactor, and (g) a step of preparing a M-M' catalyst by alloying the support with the single M metal atom deposited and the deposited M' catalyst through alloying heat treatment; and wherein the M' catalyst is a manganese (Mn) catalyst, a cerium (Ce) catalyst, or a mixture thereof; wherein the M is tungsten (W); and wherein in step (d), the reactor is heated to a reaction temperature selected within a range of 180-200° C. at a rate of 1-9° C./min, and, in step (e), the evaporator is heated to an evaporation temperature selected within a range of 90-100° C. at a rate of 1-9° C./min.

2. The method for preparing a M-M' catalyst for oxidative coupling of methane according to claim 1, wherein the gas for creating a gas atmosphere in the reactor or the carrier gas is an inert carrier gas selected from nitrogen, argon, helium and mixtures thereof, or a reactive carrier gas with oxygen or hydrogen included in the inert carrier gas, and the gas for creating a gas atmosphere in the evaporator is an inert carrier gas selected from nitrogen, argon, helium and mixtures thereof, or a reactive carrier gas with oxygen or hydrogen included in the inert carrier gas.

3. The method for preparing a M-M' catalyst for oxidative coupling of methane according to claim 1, wherein, in the step (g), the alloying heat treatment is performed under a gas atmosphere selected from air, oxygen, hydrogen and mixtures thereof at 400-1,200° C. for 1-6 hours.

4. The method for preparing a M-M' catalyst for oxidative coupling of methane according to claim 1, wherein the support is a powder or plate support, and the support comprises 0.1-20 wt % of a sodium (Na) component based on the total weight of the support and the sodium component.

5. The method for preparing a M-M' catalyst for oxidative coupling of methane according to claim 1, wherein the support is a support selected from: a ceramic-based support selected from silica gel, silica powder, alumina, zirconia, titania, zeolite and mixtures thereof; a metal-based support which is a metal plate, a metal foil or a combination thereof; a carbon-based support selected from carbon black, activated carbon, graphene, carbon nanotube, graphite and mixtures thereof; a transparent electrode; and combinations thereof.

6. The method for preparing a M-M' catalyst for oxidative coupling of methane according to claim 1, wherein, in the step (b), the M' catalyst deposited on the support is located on an amorphous material or a porous filter provided at the center of the reactor.

7. The method for preparing a M-M' catalyst for oxidative coupling of methane according to claim 1, wherein, in the step (f), the carrier gas is supplied at a rate of 10-90 sccm for 1-240 minutes.

8. The method for preparing a M-M' catalyst for oxidative coupling of methane according to claim 1, wherein the precursor is $W(CO)_6$ and the evaporation temperature is 80-100° C.

9. The method for preparing a M-M' catalyst for oxidative coupling of methane according to claim 1, wherein the precursor is $W(CO)_6$, in the step (d), the reactor is heated to a reaction temperature selected within a range of 150-250° C. at a rate of 0.1-9° C./min, in the step (e), the evaporator is heated to an evaporation temperature selected within a range of 80-150° C. at a rate of 0.1-9° C./min, in the step (f), the carrier gas is supplied at a rate of 20-100 sccm for 20-240 minutes, and the alloying heat treatment is performed under air atmosphere at 700-900° C. for 3-5 hours.

* * * * *